UNITED STATES PATENT OFFICE.

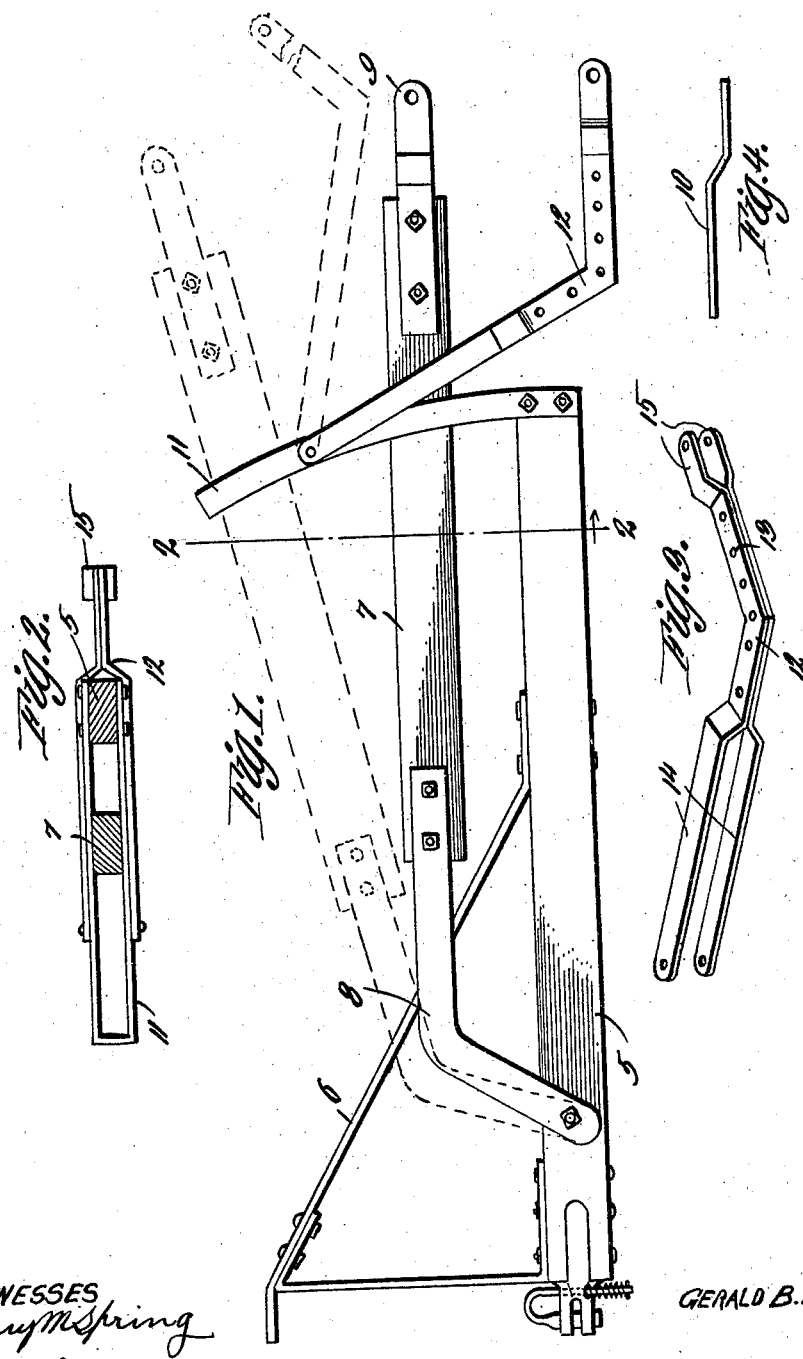

GERALD B. HIGDON, OF AMES, IOWA.

BINDER HITCH FOR TRACTORS.

1,402,608. Specification of Letters Patent. Patented Jan. 3, 1922.

Application filed January 25, 1921. Serial No. 439,743.

*To all whom it may concern:*

Be it known that I, GERALD B. HIGDON, a citizen of the United States, residing at Ames, in the county of Story and State of Iowa, have invented certain new and useful Improvements in Binder Hitches for Tractors, of which the following is a specification.

This invention relates to binder hitches for tractors, the object of which is to permit the binder or other agricultural implement to make a square turn in a facile manner.

Another object of the invention is to provide a simple type of hitch which may be quickly associated with standard binders and tractors, which will in no way hinder normal use of the same, and which will materially increase the general efficiency of the machine, especially in view of the time saved in working the same over the entire productive area of the field.

The above and other objects of this invention will be in part described and in part understood from the following description of the present preferred embodiment of the invention taken in connection with the accompanying drawings, wherein:

Fig. 1 is a top plan view of a hitch constructed in accordance with this invention.

Fig. 2 is a sectional view taken on the line 2—2 of Fig. 1, looking in the direction of the arrow.

Fig. 3, is a perspective view of the connecting fork used and

Fig. 4, is an edge elevation view of one part of the clevis used in this invention.

In the drawings, a standard type of binder stub tongue 5 is shown which has associated therewith the usual bracket 6.

The invention consists especially of a bar 7, which may be of any desired shape and size and which has one end thereof detachably engaged by straps 8, the opposite ends of the latter being turned laterally at an angle and detachably engaged with the stub tongue 5. The outer end of said bar is detachably engaged by a tractor draw bar engaging clevis generally designated 9. This clevis consists of a pair of plates 10, and are preferably of the configuration shown in Fig. 4 of the drawings. The outer ends of the plates have openings formed therein through which a clevis pin may be engaged for connecting the draw bar of the tractor.

Extending laterally from one side of the tongue 5 is an arcuate U-shaped guide 11, which consists of a single strap of metal, one end of which is engaged with the upper face of said tongue at the outer terminal of the latter and the opposite end engaged with the lower face of the tongue at said outer end. The bar 7 extends through the guide member and is limited in its movement by the vertex of the U as indicated by the dotted lines in Fig. 1.

In order to connect the guide 11 with the draw bar of the tractor a connecting fork 12 is provided which consists of a pair of straps bent at an obtuse angle and secured together by rivets 13 or the like. The furcations 14 of the fork straddle the guide 11 and are pivotally engaged therewith, said furcations incidentally straddling the bar 7. The opposite end of the fork member from that which carries the furcations 14 has the parts thereof spaced to provide apertured lugs 15 which are pivotally engaged with the draw bar of the tractor.

In use of this device motion is imparted to the binder or other agricultural implement in the usual way by movement of the tractor. When the tractor moves at right angles to make a turn, it will be apparent that initially the binder will be caused to continue in a direct path, due to the formation of the hitch. However, after the tractor has straightened out, pursuant to making the turn, the binder will be caused to turn abruptly and to follow the path taken by the tractor. This is due to the fact that in making the turn the tractor gradually causes the bar 7 to move laterally until it comes in contact with the outer end of the guide member 11, which correspondingly exerts pressure upon the fork 12. In this way, a sharp corner may be turned by the tractor in order to cover the productive area of the field with the binder or other implement being operated by the tractor. Moreover, this turning movement is accomplished without the necessity of backing or reversing the tractor, which latter operation necessarily loses time and is inconvenient to the operator of the machine.

Various changes may be made in this device, especially in the details of construction, proportion and arrangement of parts, without departing from the spirit and scope of the invention as covered by the appended claims.

What is claimed is:

1. A binder hitch for tractors including means connecting the binder and tractor, a binder tongue, a strap extending laterally from the binder tongue and embracing said means, but being unconnected thereto to permit of limited movement of the means, and secondary means engaged with said strap and the tractor to permit initial right angle movement of the tractor without deflecting the course of the binder, continued movement of the tractor causing said primary and secondary means to coact for abruptly turning the binder into the path of movement of the tractor.

2. An implement hitch for tractors including a bar one end of which is connected to the implement, a clevis carried by the opposite end of the bar for connecting the same to a tractor, a U-shaped guide member extending laterally from said implement and embracing said bar, and a fork member, one end of which is pivotally engaged with the guide and the opposite end adapted for engagement with a tractor substantially as described.

In testimony whereof I affix my signature in presence of two witnesses.

GERALD B. HIGDON.

Witnesses:
J. E. BENNETT,
F. H. SCHLEITER.